(12) United States Patent
Pettenon et al.

(10) Patent No.: US 12,022,812 B2
(45) Date of Patent: Jul. 2, 2024

(54) FLUID-DYNAMIC PUMP FOR AQUARIUMS

(71) Applicant: SICCE S.R.L., Pozzoleone (IT)

(72) Inventors: Paolo Pettenon, Cittadella (IT); Marco Pierobon, Padua (IT); Federico Carraro, Rubano (IT); Silvia Pettenon, Cittadella (IT)

(73) Assignee: SICCE S.R.L., Pozzoleone (IT)

( * ) Notice: Subject to any disclaimer, the term of this patent is extended or adjusted under 35 U.S.C. 154(b) by 147 days.

(21) Appl. No.: 17/776,579

(22) PCT Filed: Nov. 19, 2020

(86) PCT No.: PCT/IB2020/060920
§ 371 (c)(1),
(2) Date: May 12, 2022

(87) PCT Pub. No.: WO2021/099988
PCT Pub. Date: May 27, 2021

(65) Prior Publication Data
US 2022/0378023 A1    Dec. 1, 2022

(30) Foreign Application Priority Data

Nov. 19, 2019    (IT) .................. 102019000021642

(51) Int. Cl.
*A01K 63/04*    (2006.01)
*A01K 63/00*    (2017.01)
(Continued)

(52) U.S. Cl.
CPC .......... *A01K 63/047* (2013.01); *A01K 63/003* (2013.01); *A01K 63/006* (2013.01); *A01K 63/04* (2013.01); *A01K 63/045* (2013.01); *A01K 63/065* (2013.01); *F04D 13/027* (2013.01); *F04D 13/06* (2013.01); *F04D 13/08* (2013.01); *F04D 13/086* (2013.01);
(Continued)

(58) Field of Classification Search
CPC .. A01K 63/047; A01K 63/065; A01K 63/045; A01K 63/006; A01K 63/003; A01K 63/04; F04D 29/605; F04D 13/027; F04D 13/08; F04D 13/06; F04D 29/628; F04D 29/426; F04D 29/406; F04D 15/0066; F04D 29/026; F04D 13/086; F04D 15/0209
See application file for complete search history.

(56) References Cited

U.S. PATENT DOCUMENTS 8,747,075 B1    6/2014    Gandini
10,451,073 B2 *  10/2019   Fecke ....................... H02K 5/04
(Continued)

FOREIGN PATENT DOCUMENTS

AU          2019200524 B1    8/2019
KR          20180089697 A    8/2018
WO      WO-2019158320 A1 *  8/2019   ............. F04B 49/06

*Primary Examiner* — Peter J Bertheaud
(74) *Attorney, Agent, or Firm* — Carmel Patent Agency LLC; Robert Ballarini

(57) ABSTRACT

A fluid-dynamic pump which is suitable for circulating water in an aquarium includes a rotary device, an electric motor configured to move the rotary device, a pump body which houses a printed circuit board which that controls the electric motor and a temperature sensor that detects the temperature of the water of the aquarium. The temperature sensor is positioned on the pump body.

16 Claims, 3 Drawing Sheets

(51) Int. Cl.
*A01K 63/06* (2006.01)
*F04D 13/02* (2006.01)
*F04D 13/06* (2006.01)
*F04D 13/08* (2006.01)
*F04D 15/00* (2006.01)
*F04D 15/02* (2006.01)
*F04D 29/02* (2006.01)
*F04D 29/40* (2006.01)
*F04D 29/42* (2006.01)
*F04D 29/60* (2006.01)
*F04D 29/62* (2006.01)

(52) U.S. Cl.
CPC ..... *F04D 15/0066* (2013.01); *F04D 15/0209* (2013.01); *F04D 29/026* (2013.01); *F04D 29/406* (2013.01); *F04D 29/426* (2013.01); *F04D 29/605* (2013.01); *F04D 29/628* (2013.01)

(56) References Cited

U.S. PATENT DOCUMENTS

2008/0044293 A1* 2/2008 Hanke .................. A01K 63/047
417/14
2021/0115928 A1* 4/2021 Nielsen .................. F04D 13/06

\* cited by examiner

FLUID-DYNAMIC PUMP FOR AQUARIUMS

CROSS-REFERENCE TO RELATED APPLICATIONS

This application is a § 371 National Phase of PCT/IB2020/060920, filed Nov. 19, 2020, which claims priority of Italian Patent Application number 102019000021642, filed Nov. 19, 2019, the entire contents of all of which are incorporated by reference herein as if fully set forth.

FIELD OF THE INVENTION

The invention relates to a fluid-dynamic pump which is also referred to as a hydraulic pump, in particular for aquariums. The invention further relates to a fluid-dynamic pump of the type comprising a rotary device, an electric motor which is suitable for moving the rotary device and a pump body, inside which there is present a printed circuit board which is suitable for controlling the electric motor.

BACKGROUND

Fluid-dynamic pumps for aquariums, also referred to below for simplicity as "fluid-dynamic pumps" or "pumps", are mainly used to promote the circulation and movement of the water inside the aquarium itself, impelling the water towards the filters and preventing it from stagnating, thereby contributing to maintaining the aquarium in a healthy state.

There are mainly two main types of fluid-dynamic pumps: centrifugal pumps and axial pumps.

The centrifugal pump uses the centrifugal effect of the impeller thereof to move the liquid, converting the mechanical energy from the motor thereof initially into kinetic energy and subsequently into pressure energy which confers on the raised liquid.

The main function thereof is to promote the recirculation of the water taken from the service tank, also called the sump, of the aquarium.

Centrifugal pumps for aquariums can be of two main types: the immersion type, mainly installed inside the service tank, and the dry type (also called in-line) which are installed outside the service tank and which are generally connected by means of a water-tight connection.

In the axial pump, or helical pump, the movement of the fluid is ensured by a ducted impeller which impels the fluid itself as a marine impeller: the inclined vanes of the impeller rotate and impel the fluid in the desired direction.

This type of pump, unlike the centrifugal ones, can be used only with immersion.

Modern fluid-dynamic pumps increasingly make use of "smart" functions as a result of which the user can monitor and control different parameters connected with the aquarium, for example, using a Smartphone or a computer.

The term "smart" is intended to be understood to refer to items of equipment which are connected to the internet by means of a WiFi connection and which are accessible and controllable remotely by means of any computer or mobile device with a connection to the internet.

In order to monitor the temperature of the water contained in the aquarium, there is provision for the fluid-dynamic pump to be connected to a temperature sensor.

Fluid-dynamic pumps which are commercially available nowadays provide for the use of sensors which are external with respect to the pump body and which are provided with individual cables. This solution involves the problem of having to find a suitable space for the temperature sensors which will therefore have to be positioned and fixed in the aquarium, leading to the production of additional spatial requirements. The cables with which the temperature sensors are provided further require additional space which, in a restricted environment such as the one in aquariums, can involve different positioning problems.

Therefore, the problem addressed by the present invention is to provide a fluid-dynamic pump which is structurally and functionally configured to at least partially overcome one or more of the disadvantages set out with reference to the cited prior art.

An additional object of the invention is to provide a fluid-dynamic pump which can be particularly versatile during use while maintaining a generally simple structure.

SUMMARY

This problem is solved and one or more of these objects is/are achieved by the invention by means of a fluid-dynamic pump constructed according to one or more of the appended claims.

It will be appreciated that the pump according to the present invention is a fluid-dynamic pump which is suitable for circulating water in an aquarium and which comprises: a rotary device; an electric motor which is suitable for moving the rotary device; a pump body, inside which there is present a printed circuit board which is suitable for controlling the electric motor; a temperature sensor which is suitable for detecting the temperature of the water of the aquarium. The temperature sensor is positioned on the pump body, thereby limiting the spatial requirements taken up inside the tank of the aquarium.

BRIEF DESCRIPTION OF THE DRAWINGS

The features and advantages of the invention will be better appreciated from the detailed description of a number of embodiments thereof which are illustrated by way of non-limiting example with reference to the appended drawings, in which.

DETAILED DESCRIPTION OF THE PREFERRED EMBODIMENTS

Figure 1:
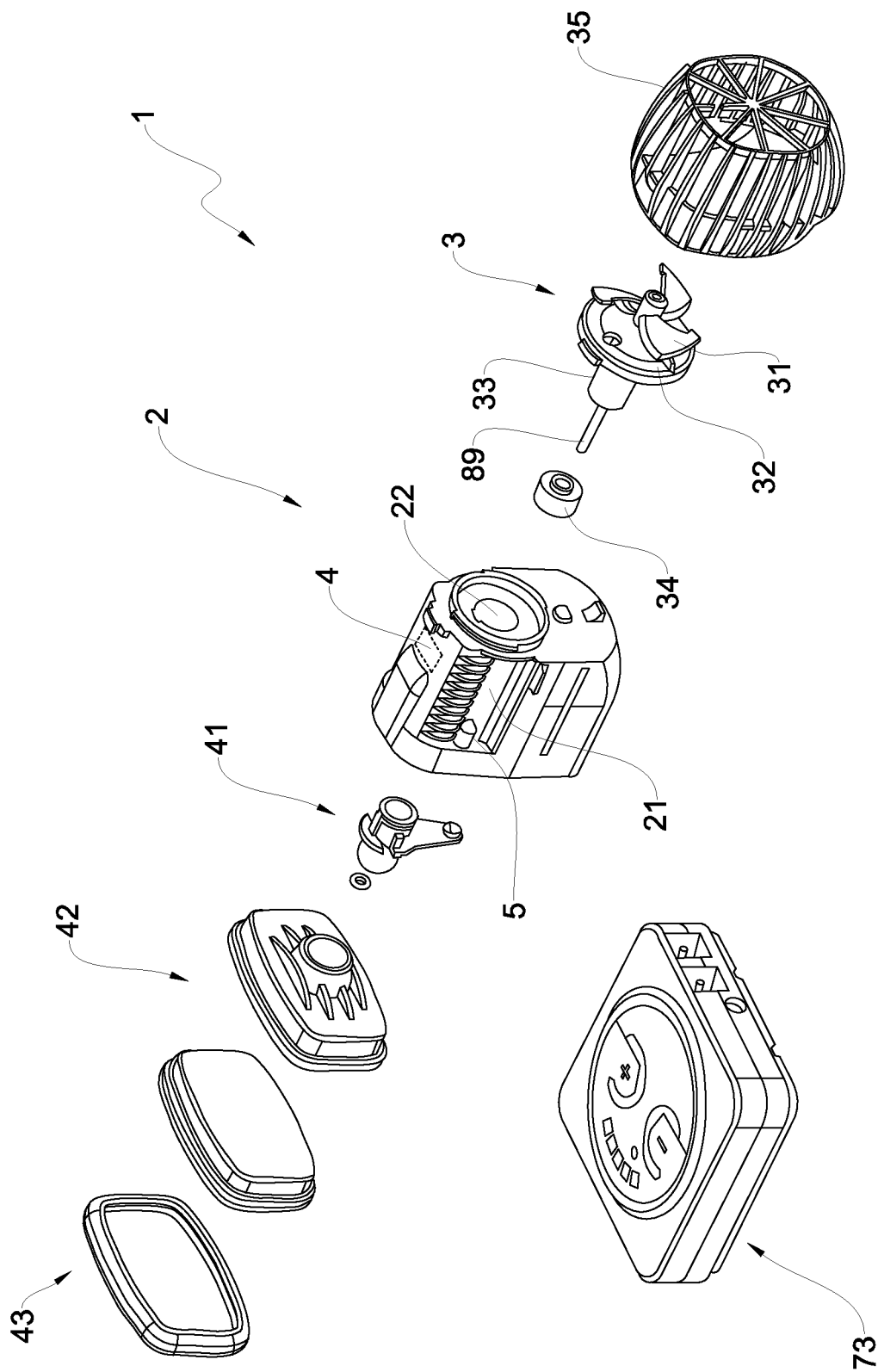
FIG. 1 is an exploded view of a first embodiment of the fluid-dynamic pump.

According to a first embodiment, which can be seen in FIG. 1, the fluid-dynamic pump 1 is of the axial type. This type of pump can operate only with immersion and is preferably placed in the main tank 91 of the aquarium 90, which can be seen in FIG. 3.

The pump 1 of FIG. 1 comprises a pump body 2 which has an approximately box-like shape. The pump 1 includes a rotary device 3 which is suitable for moving the water in the aquarium 90 and the characteristics of which will be set out in greater detail below.

In preferred embodiments, the rotary device 3 preferably comprises an impeller 31, preferably with a helical extent, a closure plate 32 which is suitable for connecting the rotary device 3 to the pump body 2, a rotor 33, a shaft 89, with which there can be associated a bearing 34, and preferably a grid 35 which is suitable for protecting the impeller 31.

The pump body 2 has an opening 22 which is suitable for receiving the rotor 33, the shaft 36 and the bearing 34 in such a manner that the rotor 33 faces the electric motor (not depicted) inside the pump body 2.

According to another aspect of the invention, the pump 1 may comprise a rotary support which is provided with a bearing 41, a magnetic support 42 and preferably a housing 43 made from anti-vibration rubber.

The pump 1 further comprises a temperature sensor 5, for example, of the thermocouple type.

The temperature sensor 5 is suitable for detecting the temperature of the water of the aquarium 90.

As can be seen in the Figure, in the pump of the present invention the sensor 5 is directly positioned on the pump body 2. Preferably, the temperature sensor 5 is positioned in a groove 21 which is formed in the pump body 2. In some embodiments, this groove 21 extends mainly in an axial direction of the pump. It will be appreciated that, in the context of the present invention, the term axial direction is intended to be understood to refer to a direction parallel with the rotation axis of the rotary device 3 and therefore parallel with the shaft 89.

According to a preferred embodiment, the groove 21 is formed in a flank of the pump body 2.

On the basis of yet another aspect, the temperature sensor 5 is arranged near the end of the pump body 2, in the axial direction defined by the shaft 89, opposite the impeller 31.

These features contribute to ensuring a correct influx of the liquid onto the sensor 5 during the operation of the pump in order to detect the temperature.

Figure 2:
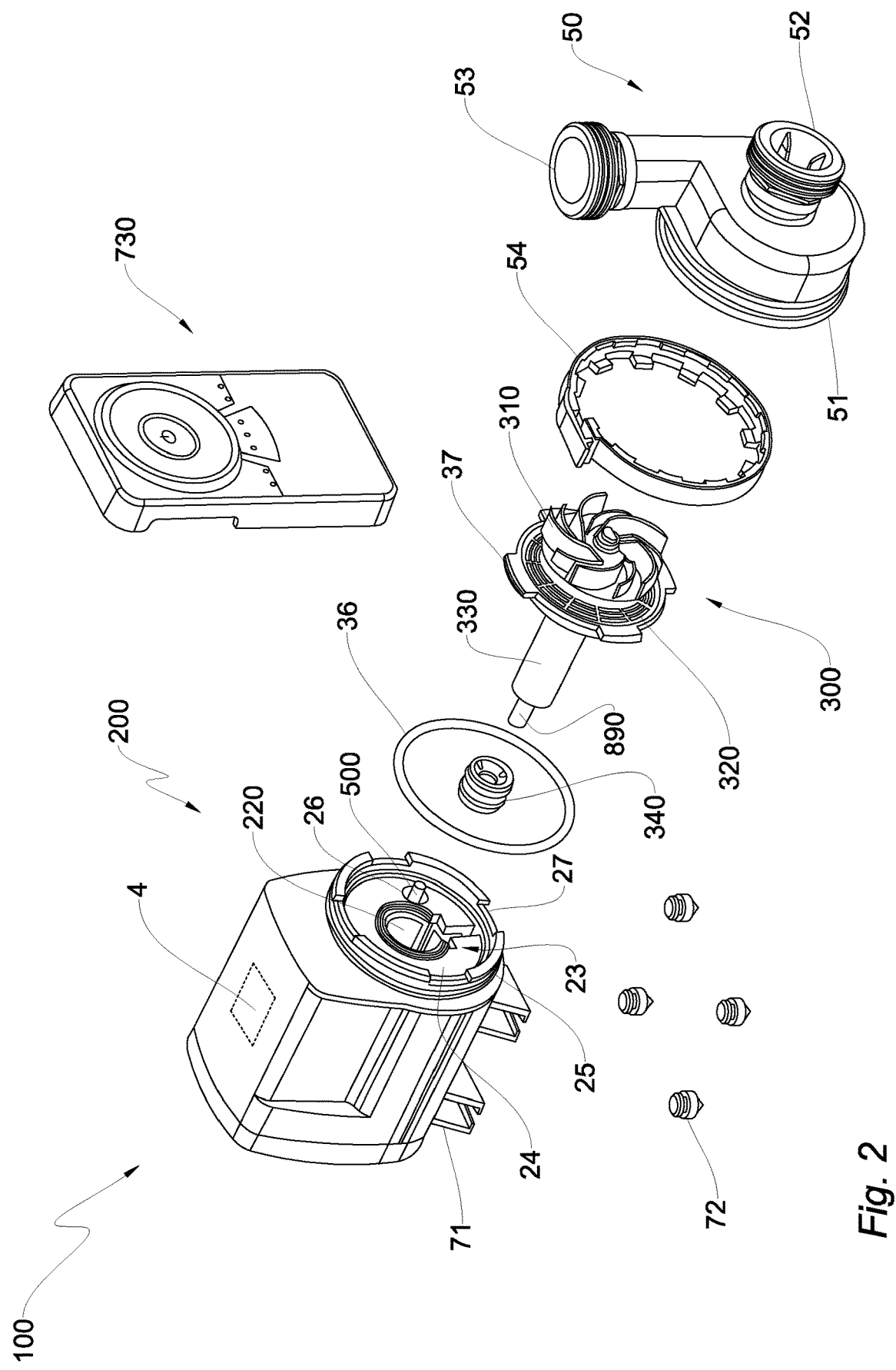
FIG. 2 is an exploded view of a second embodiment of the fluid-dynamic pump.

In the second embodiment, which can be seen in FIG. 2, the fluid-dynamic pump 100 is of the centrifugal type.

Figure 3:
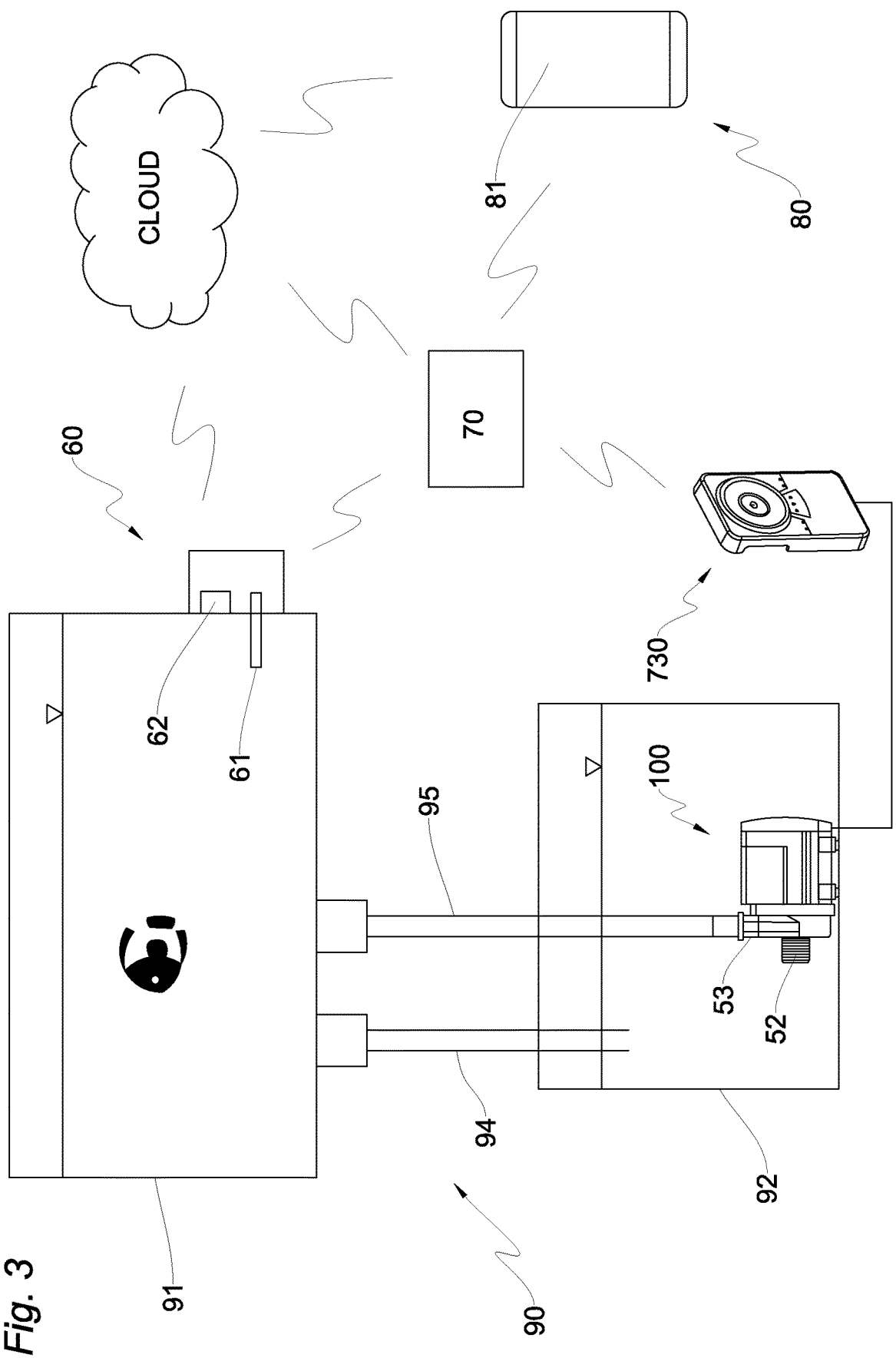
FIG. 3 is a possible diagram of the aquarium and the "smart" functions which are connected with the fluid-dynamic pump.

This type of pump may be of the immersion type, that is to say, positioned inside an auxiliary tank 92, which is schematically shown in FIG. 3, or of the dry type (also referred to as in-line), that is to say, positioned outside the auxiliary tank 92. FIG. 3 shows the configuration with immersion of the pump 100, but in other embodiments the pump 100 may be of the dry type. If the auxiliary tank 92 is not present, the centrifugal pump 100 can be positioned on the main tank 91, both as an immersion type and as a dry type.

The pump 100 of FIG. 2 comprises a pump body 200 which has an approximately box-like shape.

According to another aspect of the invention, the pump body 200 preferably comprises a plurality of support elements 71 which are provided to receive in suitable openings a corresponding number of anti-vibration feet 72. This allows the pump 100, in the event that it is positioned on the base of the tank, not to transmit thereto forces and vibrations during use, promoting the silent nature thereof. Preferably, there are present four support elements 71, with each of which an anti-vibration foot 72 is combined.

The pump 100 includes a rotary device 300 which is suitable for moving the water in the aquarium 90. The rotary device 300 preferably comprises an impeller 310, a closure plate 320 which is suitable for connecting the rotary device 300 to the pump body 200, a rotor 330 and a shaft 890, with which a bearing 340 can be associated.

The pump body 200 comprises an operating surface 24 which has an opening 220 which is suitable for receiving the rotor 330, the shaft 890 and the bearing 340 so that the rotor 330 faces the electric motor (not depicted) inside the pump body 200.

According to another aspect of the invention, there is present on the operating surface 24 a protuberance 25 which is suitable for being combined with the closure plate 320 of the rotary device 300. Preferably, this protuberance 25 has a circular shape and has slots 27 which are suitable for receiving the projecting portions 37 of the closure plate 320. Even more preferably, an O-ring 36 is positioned between the operating surface 24 and the conveying device 50 in order to prevent possible losses of water outside the chamber 23 of the rotary device 300. The protuberance 24 has an external groove which is suitable for being combined with a conveying device 50, which will be described below.

In greater detail, the conveying device 50 is suitable for containing the rotary device 300. Preferably, the conveying device 50 comprises a conveying member 51, which is substantially cylindrical and which has a diameter which is slightly greater than the diameter of the impeller 310 so as to be able to contain it therein, an inlet pipe 52 and an outlet pipe 53, which are suitable for introducing and discharging the water to/from the pump 100. The conveying device 50 is connected to the pump body 200.

There is preferably used a closure ring 54 in order to connect the conveying body 51 to the protuberance 25 of the operating surface 24 of the pump body 200: the space delimited by this connection is defined as the chamber 23 of the rotary device 300 because the rotary device 300 is contained inside this chamber 23. In other words, the chamber 23 of the rotary device 300 is preferably delimited by the pump body 200 and the conveying device 50. Even more preferably, the chamber 23 of the rotary device 300 is delimited by the operating surface 24 of the pump body 200 and the conveying body 51.

In this embodiment, the temperature sensor 500 is also positioned in the pump body 200, preferably inside the chamber 23 of the rotary device 300.

In some embodiments, such as the one illustrated, the temperature sensor 500 is positioned on the operating surface 24 of the pump body 200.

Preferably, this operating surface 24 has an indentation 26, in which the temperature sensor 500 is positioned in a projecting state.

In other embodiments which are not illustrated, the temperature sensor 500 can be positioned in the pump body 200 of a pump 100 of the centrifugal type, but outside the chamber 23 of the rotation device 300. The temperature sensor 500 can be, for example, positioned in a groove similarly to the way seen above for the pump 1 of the axial type. This configuration is less preferable with respect to the case illustrated in FIG. 2 because the centrifugal pump 100 can thereby operate only with immersion and not in the dry state.

Inside the pump body, there is present for all types of fluid-dynamic pump to which the invention relates, a printed circuit board 4 which is schematically illustrated in FIGS. 1 and 2. The printed circuit board 4 is suitable for controlling the electric motor, being capable of activating or deactivating it as necessary.

The printed circuit board 4 receives the value detected by the temperature sensor and sends this value to an external controller which is designated 73 in the first embodiment and 730 in the second one. Therefore, FIGS. 1 and 2 show two different types of controller, the form of which varies in accordance with the type of pump; the function of the controller is the same in any case, independently of the form. Preferably, the external controller is connected to the fluid-dynamic pump by means of an electric wire, as can be seen in FIG. 3. In other embodiments, the connection may be brought about wirelessly, for example, by means of Bluetooth or infrared, or generally with a remote control.

The external controller can be connected to the internet via a web access device 70 which is schematically shown in FIG. 3. The web access device 70 may be, for example, a WiFi router.

The external controller, once connected to the internet network, is capable of transferring the data measured by the temperature sensor to a cloud.

The term "cloud" is intended to be understood to refer to the technology which allows data to be processed and archived on a network and which, via the internet, allows access to be afforded to applications and data which are stored on a remote hardware item instead of on the local workstation.

The data item measured by the temperature sensor, once transferred to the cloud, becomes accessible by a control device 80 which is connected to the internet, for example, a computer or a Smartphone. Preferably, the control device 80 is capable of being connected to the internet and therefore to the cloud using the web access device 70. Alternatively, the control device 80 is capable of being connected to the internet and therefore to the cloud by means of a data network, for example, a sim of a mobile telephone.

According to another aspect of the invention, the control device 80 is provided with a software item on which there is installed an application which allows the user to display the value detected by the temperature sensor on a screen 81 of the control device 80.

Preferably, the application provides a warning message for the user if the value measured by the temperature sensor is outside a predefined range. This range may be imposed by the user, for example, via the control device 80 or via the controller; alternatively, this range can be supplied by a server, where, for example, the ideal values for the water temperature of the aquarium 90 under different conditions are saved.

FIG. 3 illustrates a possible diagram of the aquarium 90 and the "smart" functions which are connected with the fluid-dynamic pump. The embodiment illustrated in FIG. 3 is merely an example; the same diagram is in fact provided for all types of fluid-dynamic pump to which the invention relates.

FIG. 3 schematically illustrates the main tank 91 and the service tank (or sump) 92 of the aquarium 90. The fluid-dynamic pump 100 illustrated in FIG. 3 is of the centrifugal type with immersion and is positioned inside the service tank 92. The water of the main tank 91 passes through a first tube 94 and is introduced into the service tank 92. The pump 100 receives the water from the inlet pipe 52 and impels the water upwards from the outlet pipe 53, which is connected to a second tube 95 which carries the water being discharged from the pump 100 to the main tank 91.

In the embodiment in FIG. 3, there is present an actuation device 60. This device is suitable for modifying the temperature of the water of the aquarium 90.

The actuation device 60 preferably comprises a heater 61 and a cooling unit 62. In other embodiments, the actuation device 60 comprises a heater 61 or a cooling unit 62. The heater 61 serves to heat the water of the aquarium 90; the heater 61 preferably comprises an electrical resistance which is immersed in the main tank 91. The cooling unit 62 serves to cool the water of the aquarium 90; the cooling unit 62 preferably comprises a refrigerating chiller of the dry type (in-line) which is positioned on an external surface of the main tank 91 or the service tank 92.

According to another aspect of the invention, the actuation device 60 comprises an electronic control unit 63 with wireless communication via WiFi which allows the actuation device 60 to be connected to the internet by means of the web access device 70.

The application installed in the software of the control device 80 allows the user to impose the desired temperature value of the water of the aquarium 90.

The control device 80 transfers the temperature value imposed by the user to the cloud. The actuation device 60 is capable of being connected to the cloud by means of the electronic control unit 63 with wireless communication via WiFi which is installed thereon and of identifying from the cloud the temperature value imposed by the user. Once the temperature value imposed by the user has been identified, the actuation device 60 acts as a thermostat. If the temperature value imposed by the user is higher than the temperature value of the water of the aquarium 90 measured by the temperature sensor 5, 500, the actuation device 60 will activate the heater 61 and/or will switch off the cooling unit 62. In the opposite case, the actuation device 60 will activate the cooling unit 62 and/or switch off the heater 61.

The invention claimed is:

1. A fluid-dynamic pump, for circulating water in an aquarium, comprising:
   a rotary device which defines a rotation axis;
   an electric motor configured to move the rotary device;
   a pump body, housing a printed circuit board configured to control the electric motor;
   a temperature sensor configured to detect the temperature of the water of the aquarium;
   wherein the temperature sensor is positioned on the pump body; and wherein the fluid-dynamic pump is a centrifugal type and comprises a conveying device, the temperature sensor being positioned inside a chamber which is defined in the pump body, in which the rotary device is at least partially received, the chamber being delimited by an operating surface of the pump body, which an impeller of the rotary device faces, and by the conveying device, wherein a protuberance is formed on the operating surface which is configured to be combined with a closure plate of the rotary device, the closure plate being received in the chamber.

2. The fluid-dynamic pump according to claim 1, wherein the temperature sensor is positioned in a groove which is formed in the pump body.

3. The fluid-dynamic pump according to claim 2, wherein the groove generally extends in an axial direction of the fluid-dynamic pump.

4. The fluid-dynamic pump according to claim 3, wherein the axial direction is parallel with the rotation axis of the rotary device.

5. The fluid-dynamic pump according to claim 2, wherein the groove is formed in a flank of the pump body.

6. The fluid-dynamic pump according to claim 2, wherein the temperature sensor is arranged proximate an end of the pump body, the end being defined in a direction parallel with the rotation axis of the rotary device.

7. The fluid-dynamic pump according to claim 1, wherein the protuberance has a circular shape and comprises slots which are configured so as to receive projecting portions of the closure plate.

8. The fluid-dynamic pump according to claim 1, wherein an O-ring is positioned between the operating surface and the conveying device so as to produce a fluid-tight closure of the chamber.

9. The fluid-dynamic pump according to claim 1, wherein the fluid-dynamic pump is an immersion or a dry type.

10. The fluid-dynamic pump according to claim 1, wherein the printed circuit board receives a value which is detected by the temperature sensor and transmits said value to an external controller.

11. The fluid-dynamic pump according to claim 10, wherein the external controller is connected to the Internet via a web access device and transfers the value detected by the temperature sensor to a cloud.

12. The fluid-dynamic pump according to claim 11, wherein a control device is capable of accessing the cloud and is provided with a software item having an application installed thereon which allows the user to display the value detected by the temperature sensor on a screen of the control device.

13. The fluid-dynamic pump according to claim 12, wherein the control device is configured so as to provide a warning message if the value detected by the temperature sensor is outside a predefined range.

14. A fluid-dynamic pump, for circulating water in an aquarium, comprising:
   a rotary device which defines a rotation axis;
   an electric motor configured to move the rotary device;
   a pump body, housing a printed circuit board configured to control the electric motor;
   a temperature sensor configured to detect the temperature of the water of the aquarium; wherein the temperature sensor is positioned on the pump body, and wherein the printed circuit board receives a value which is detected by the temperature sensor and transmits said value to an external controller, the external controller is connected to the Internet via a web access device and transfers the value detected by the temperature sensor to a cloud, and wherein a control device is capable of accessing the cloud and is provided with a software item having an application installed thereon which allows a user to display the value detected by the temperature sensor on a screen of the control device, the control device being configured to allow the user to impose a desired temperature value for the water of the aquarium by controlling an actuation device which is connected to the Internet by means of the web access device.

15. The fluid-dynamic pump according to claim 14, wherein the actuator device comprises a heater and/or a cooling unit and acts as a thermostat in order to keep constant the water temperature value imposed by the user.

16. A fluid-dynamic pump, for circulating water in an aquarium, comprising:
   a rotary device comprising a rotor which defines a rotation axis;
   an electric motor configured to move the rotary device;
   a pump body, housing a printed circuit board configured to control the electric motor and having an opening in which the rotor is received;
   a temperature sensor configured to detect the temperature of the water of the aquarium;
   wherein the temperature sensor is positioned on the pump body, the temperature sensor being positioned in an oblong groove which is formed in the pump body, said oblong groove extending in an axial direction parallel with the rotation axis of the rotary device, wherein the oblong groove is not in communication with the opening in which the rotor is received.

\* \* \* \* \*